(12) United States Patent  
Rand

(10) Patent No.: US 7,185,031 B2  
(45) Date of Patent: Feb. 27, 2007

(54) CREATING A BACKUP VOLUME USING A DATA PROFILE OF A HOST VOLUME

(75) Inventor: David Leroy Rand, Kihei, HI (US)

(73) Assignee: Quantum Corporation, San Jose, CA (US)

( * ) Notice: Subject to any disclaimer, the term of this patent is extended or adjusted under 35 U.S.C. 154(b) by 461 days.

(21) Appl. No.: 10/391,115

(22) Filed: Mar. 17, 2003

(65) Prior Publication Data

US 2004/0002999 A1    Jan. 1, 2004

Related U.S. Application Data

(60) Provisional application No. 60/367,553, filed on Mar. 25, 2002.

(51) Int. Cl.
*G06F 12/00* (2006.01)
*G06F 13/00* (2006.01)

(52) U.S. Cl. .................. 707/204; 707/205; 707/104.1; 711/114; 711/162

(58) Field of Classification Search ........ 707/204–205; 711/114, 162; 714/6, 11
See application file for complete search history.

(56) References Cited

U.S. PATENT DOCUMENTS

| 5,109,485 | A | * | 4/1992 | Smith, Jr. ................... 709/213 |
| 5,435,004 | A | * | 7/1995 | Cox et al. ................... 707/205 |
| 5,737,745 | A | * | 4/1998 | Matsumoto et al. ........ 711/114 |
| 5,765,173 | A | * | 6/1998 | Cane et al. ................. 707/204 |
| 5,835,953 | A | * | 11/1998 | Ohran ........................ 711/162 |
| 5,875,478 | A | * | 2/1999 | Blumenau .................... 711/162 |
| 5,907,672 | A | * | 5/1999 | Matze et al. .................... 714/8 |
| 5,987,566 | A | * | 11/1999 | Vishlitzky et al. .......... 711/114 |
| 6,081,875 | A | * | 6/2000 | Clifton et al. .............. 711/162 |
| 6,205,450 | B1 | * | 3/2001 | Kanome ..................... 707/203 |
| 6,208,999 | B1 | * | 3/2001 | Spilo et al. ................. 707/202 |
| 6,269,431 | B1 | * | 7/2001 | Dunham ..................... 711/162 |
| 6,282,610 | B1 | * | 8/2001 | Bergsten ..................... 711/114 |
| 6,341,278 | B1 | * | 1/2002 | Yamamoto et al. ............ 707/2 |
| 6,366,987 | B1 | * | 4/2002 | Tzelnic et al. .............. 711/162 |
| 6,374,266 | B1 | * | 4/2002 | Shnelvar .................... 707/204 |

(Continued)

FOREIGN PATENT DOCUMENTS

WO    WO 99/12098    3/1999

(Continued)

OTHER PUBLICATIONS

European Search Report mailed on Aug. 2, 2004, for EP patent application No. EP 03251873 filed Mar. 25, 2003, 3 pages.

*Primary Examiner*—John E. Breene
*Assistant Examiner*—Anh Ly
(74) *Attorney, Agent, or Firm*—Morrison & Foerster LLP (57) ABSTRACT

A backup volume on a backup system is created/updated by reading data stored on a host volume on a host system. A data profile for the host volume is generated based on the read data, where the data profile characterizes the data stored on the host volume. The data profile is sent to the backup system, and data that does not need to be obtained from the host system is determined on the backup system based on the data profile.

23 Claims, 4 Drawing Sheets

U.S. PATENT DOCUMENTS

| | | | |
|---|---|---|---|
| 6,446,175 B1* | 9/2002 | West et al. | 711/162 |
| 6,460,054 B1* | 10/2002 | Grummon | 707/204 |
| 6,480,948 B1* | 11/2002 | Virajpet et al. | 711/202 |
| 6,490,598 B1* | 12/2002 | Taylor | 707/204 |
| 6,931,422 B1* | 8/2005 | Gusler et al. | 707/204 |
| 2001/0014929 A1* | 8/2001 | Taroda et al. | 711/4 |
| 2002/0144068 A1* | 10/2002 | Ohran | 711/161 |
| 2002/0144069 A1* | 10/2002 | Arakawa et al. | 711/162 |
| 2002/0155865 A1* | 10/2002 | Aoyama | 455/572 |
| 2002/0161983 A1* | 10/2002 | Milos et al. | 711/202 |
| 2002/0178276 A1* | 11/2002 | McCartney et al. | 709/231 |
| 2003/0074378 A1* | 4/2003 | Midgley et al. | 707/204 |
| 2004/0054866 A1* | 3/2004 | Blumenau et al. | 711/202 |
| 2004/0260673 A1* | 12/2004 | Hitz et al. | 707/1 |

FOREIGN PATENT DOCUMENTS

WO     WO 01/65371 A2     9/2001

* cited by examiner

CREATING A BACKUP VOLUME USING A DATA PROFILE OF A HOST VOLUME

CROSS-REFERENCE TO RELATED APPLICATION

This application claims priority of an earlier filed provisional application U.S. Provisional Application Ser. No. 60/367,553, titled BACKUP SYSTEM POPULATION ALGORITHM, filed Mar. 25, 2002, which is incorporated herein by reference in its entirety.

BACKGROUND

1. Field of the Invention

The present application generally relates to a backup system, and more particularly to creating/updating a backup volume using a data profile of a host volume.

2. Related Art

In a convention backup system, data stored on a host volume is copied to a backup volume. Thus, data stored on the backup volume corresponds to data stored on the host volume at a point in time (i.e., the time when the data was copied). If the host volume fails, then data stored on the backup volume can be used to restore the host volume.

Typically the backup volume is created by capturing all the data stored on the host volume at a point in time and copying the data to the backup volume. To capture the data stored on the host volume, the host volume is typically taken off-line, which means that access to the host volume is denied or limited. To copy the data to the backup volume, the data stored on the host volume is typically transmitted from the host volume to the backup volume, which can be time and bandwidth consuming.

SUMMARY

In one exemplary embodiment, a backup volume on a backup system is created/updated by reading data stored on a host volume on a host system. A data profile for the host volume is generated based on the read data, where the data profile characterizes the data stored on the host volume. The data profile is sent to the backup system, and data that does not need to be obtained from the host system is determined on the backup system based on the data profile.

DETAILED DESCRIPTION

The following description sets forth numerous specific configurations, parameters, and the like. It should be recognized, however, that such description is not intended as a limitation on the scope of the present invention, but is instead provided to provide a better description of exemplary embodiments.

Figure 1:
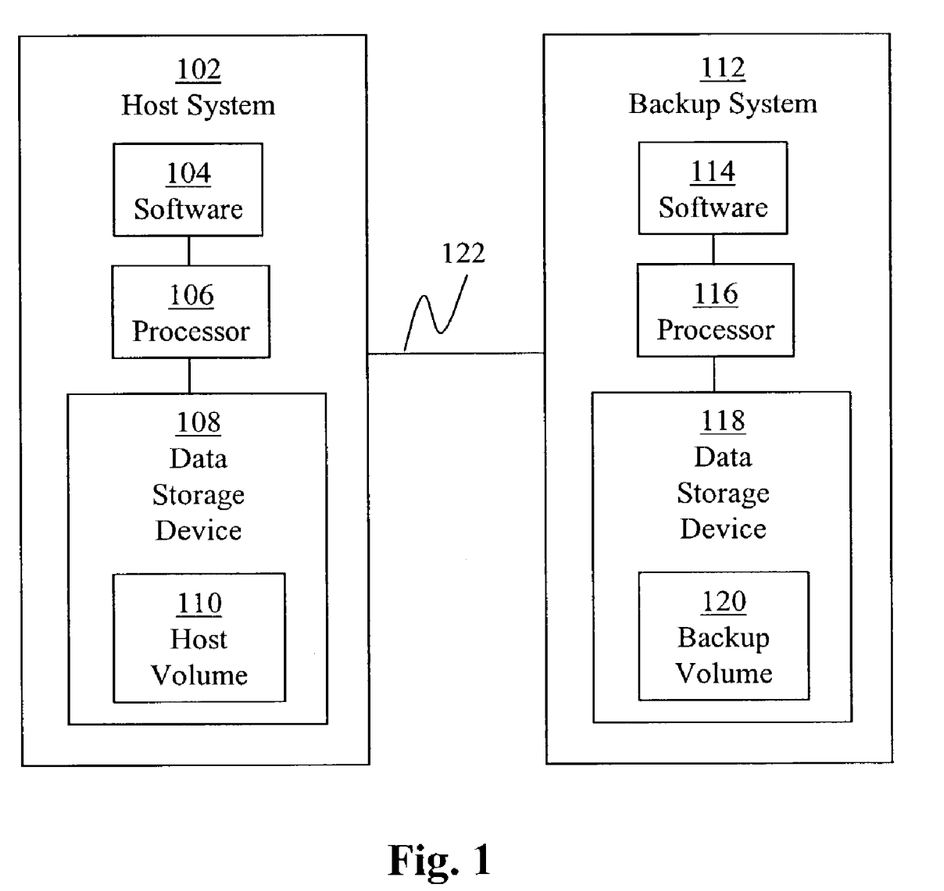
FIG. 1 depicts an exemplary host system and an exemplary backup system.

FIG. 1 depicts an exemplary embodiment of a host system 102 connected to a backup system 112. As depicted in FIG. 1, host system 102 includes a data storage device 108 with a host volume 110. Backup system 112 also includes a data storage device 118 with a backup volume 120. In the present exemplary embodiment, backup volume 120 is a copy of host volume 110 at a point in time, which is generally referred to as a "snapshot" of host volume 110. It should be recognized, however, that backup volume 120 can also be used as a baseline image in a continuous backup scheme. For a more detailed description of an exemplary continuous backup scheme, see U.S. patent application Ser. No. 09/588,242, titled DATA STORAGE SYSTEM AND PROCESS, incorporated herein by reference in its entirety.

Data storage device 108/118 can be various types of devices capable of storing data, such as hard drives, tape drives, various removable media, writeable CD-ROMs, Write Once Read Many (WORMs) flash memories, Electrically Erasable Programmable Read Only Memories (EEPROMs), and the like. Data storage device 108/118 can be any combination of two or more types of devices. Additionally, data storage device 108/118 can be a single device or multiple devices. For example, data storage device 108 on host system 102 can include two or more hard drives. Similarly, data storage device 118 on backup system 112 can be a redundant array of inexpensive/independent disks (RAID) system, such as a RAID array level 0, 1, and/or 5.

Host volume 110 can be a portion of a single data storage device 108 or span multiple data storage devices 108. Similarly, backup volume 120 can be a portion of a single data storage device 118 or span multiple data storage devices 118. Additionally, the configuration of host volume 110 and backup volume 120 need not be identical to each other. For example, host volume 110 can be a portion of a single data storage device 108, such as a partition of a high-capacity hard disk, while backup volume 120 can span multiple data storage devices 118, such as a RAID system.

As depicted in FIG. 1, host system 102 and backup system 112 include backup software 104, 114 and processors 106, 116, respectively. In the present exemplary embodiment, backup software 104 and processor 106 are configured to control the backup operation of host system 102. Similarly, backup software 114 and processor 116 are configured to control the backup operation of backup system 112. It should be recognized, however, that host system 102 and backup system 112 can include various components, both hardware and software, that are not depicted in FIG. 1.

As also depicted in FIG. 1, host system 102 and backup system 112 are connected through a connection 122. It should be recognized that connection 122 can be a direct connection or a remote connection. For example, host system 102 and backup system 112 can be directly connected, where connection 122 is a physical cable that runs between host system 102 and backup system 112. Alternatively, host system 102 and backup system 112 can be remotely connected, where connection 122 is a network connection, such as through a local area network (LAN), a wide area network (WAN), a storage area network (SAN), the Internet, and the like.

It should also be recognized that host system 102 and backup system 112 can be housed in a single housing. For example, host system 102 and backup system 112 can be logical divisions within a single computer system. Thus, backup software 104, 114 can be one backup software, processors 106, 116 can be a single processor, and data storage devices 108, 118 can be a single data storage device. If data storage devices 108, 118 are a single data storage device, then host volume 110 and backup volume 120 can exist as separate partitions within the single data storage device. Additionally, connection 122 can represent a data bus within the single computer system or it can simply represent a logical connection.

Figure 2:
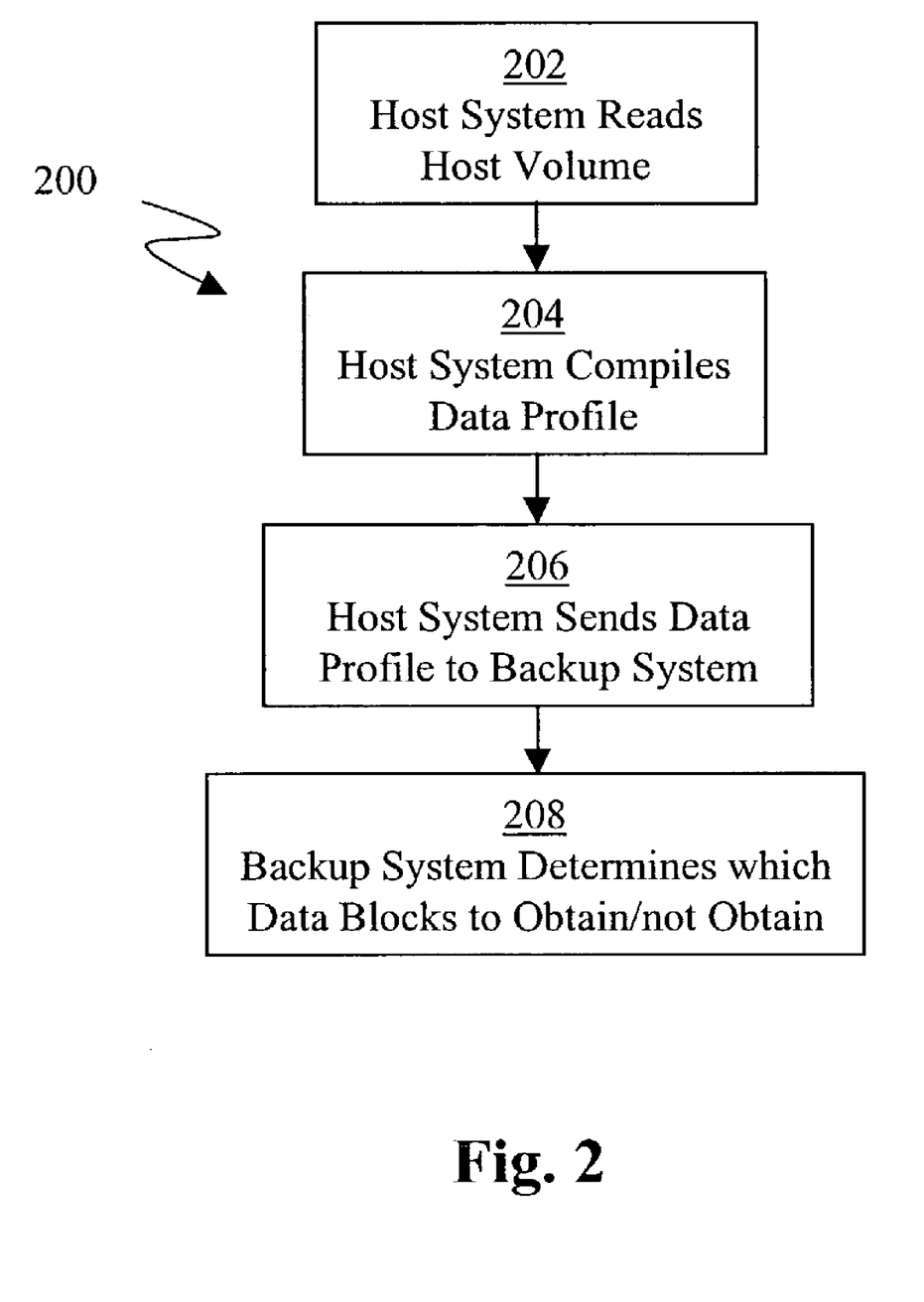
FIG. 2 depicts an exemplary process of creating/updating a backup volume.

With reference now to FIG. 2, an exemplary process 200 is depicted of creating/updating a backup volume based on a host volume. In step 202, the host system reads the host volume. More particularly, with reference to FIG. 1, host system 102, and more particularly backup software 104 and processor 106, examines the data stored on host volume 110. In one exemplary embodiment, when backup volume 120 is being created, all of the data stored on host volume 110 is examined. When backup volume 120 is being update, only the data stored on host volume 110 that had not been previously examined is examined.

With reference to FIG. 2, in step 204, the host system compiles a data profile for the host volume, which characterizes the examined data. More particularly, with reference to FIG. 1, in the present exemplary embodiment, data is stored on host volume 110 in data blocks of a predetermined length, such as 2 kbytes, 4 kBytes, 6 kbytes, and the like. Thus, after reading a data block, one or more profile parameters are assigned to characterize the data block.

In one exemplary embodiment, each data block is assigned a block state, which characterizes the allocation and/or use condition of the data block. For example, after examining a data block, host system 102 determines whether the data block is allocated. Host system 102 can also determine whether the data block is in use, meaning that the block potentially has valid data. If the data block is determined to have been allocated and in use, host system determines if the data contained in the data block matches a common data pattern, such as all zeros, all ones, and the like.

Thus, in this exemplary embodiment, each data block is assigned a block number and a block state. For example, each data block can be assigned an absolute index from the start of host volume 110 in native disk block size, such as 512 bytes. As shown in Table 1 below, the various block states can be assigned a state value, such as using hex code, which uniquely identifies each block state:

TABLE 1

| Hex Block Value | Corresponding Block State |
| --- | --- |
| 00 | Block is unallocated and unused |
| 1X | Block is allocated and used |
| 10 | Block is allocated, used, and contains all zeros |
| 11 | Block is allocated, used, and contains all ones |
| 12 | Block is allocated, used, and contains valid data |
| 1F | Block is allocated, used, but the read was bad |
| FF | Block read failed |

It should be recognized, however, that various state values can be used. It should also be recognized that more or fewer block states can be used.

In another exemplary embodiment, after examining a data block, host system 102 assigns the data block a check value, such as a cyclic redundancy code checking (CRC) code, a message-digest (MD), and the like. Thus, in this exemplary embodiment, a data block can be assigned a block number, a state value, and a check value. Alternatively, a data block can be assigned a block number and a check value.

In still another exemplary embodiment, after examining a data block, host system 102 assigns the data block a check method code and a check value to allow the use of multiple types of check methods. For example, a CRC code can be used as the check value for one data block, while a MD can be used as the check value for another data block. As shown in Table 1 below, the various check methods can be assigned a check method code, such as using hex code, which uniquely identifies each type of check method:

TABLE 2

| Hex Check Method Code | Corresponding Check Method |
| --- | --- |
| 00 | Check method unused or invalid |
| 01 | CRC-16 |
| 02 | CRC-32 |
| 03 | MD5 |
| E0 | Check method is full data copy, data follows block ID |
| FF | Check method failed |

It should be recognized, however, that various check method codes can be used. It should also be recognized that more or fewer check methods can be used.

With reference to FIG. 2, in step 206, the host system sends the data profile to the backup system. In step 208, the backup system determines which data blocks need to be obtained and which do not need to be obtained from the host system based on the received data profile.

More particularly, with reference to FIG. 1, in one exemplary embodiment described above, the data profile includes block numbers and block states for the data blocks in host volume 110. Thus, in this exemplary embodiment, certain block states are indicative of data blocks that do not need to be obtained from host system 102. For example, a data block that is identified as being unallocated and unused (corresponding to Hex Block State 00 in Table 1) need not be obtained. Additionally, certain block states are indicative of data blocks having data with a common data pattern, which can be recreated by backup system 112 without obtaining the data from host system 102. For example, a data block that is identified as allocated, used, and containing all zeros (corresponding to Hex Block State 10) or all ones (corresponding to Hex Block State 11). Thus, in this manner, the number of data blocks that need to be obtained from host system 102 can be reduced.

In another exemplary embodiment described above, the data profile includes check values for the data blocks in host volume 110. Thus, in this exemplary embodiment, if a corresponding data block exists in backup volume 120 to a data block in host volume 110, the check values can be used to determine if the data blocks are the same. More particularly, before sending the data profile, host system 102 generates the check value for a data block based on the data in the data block in host volume 110. Backup system 112 calculates a check value for the corresponding data block based on the data in the corresponding data block in backup volume 120. Backup system 112 then compares the two check values and if the check values are the same, then the data in the two data blocks are assumed to be the same. Thus, if the check values are the same, then the data block in host volume 110 does not need to be obtained.

As noted above, in still another exemplary embodiment, multiple check methods can be used. In this exemplary embodiment, the profile data includes check method codes and check values for the data blocks. Thus, before calculating a check value for the corresponding data block in backup volume 120, backup system 112 examines the check method code for the data block to determine which check method to use.

As also noted above, the data profile can include both block states and check values. In this case, the block states can be used to eliminate the data blocks that do not contain data, then the check values can be used to determined which data blocks that contain data do not need to be obtained from host system 102. Alternatively, the block states can be used to eliminate the data blocks that do not contain data or data blocks having data patterns that can be recreated, then the remaining data blocks can be obtained from host system 102 and the check values can be used to verify that the backup process has been successful.

It should be recognized that exemplary process 200 can include any number of additional steps not depicted in FIG. 2. It should also be recognized that process 200 can be implemented as a computer program, which includes computer executable instructions to direct the operation of host system 102 (FIG. 1) and/or backup system 112 (FIG. 1). For example, with reference to FIG. 1, process 200 (FIG. 2) can be a routine within backup software 104, 114 to direct the operation of processors 106, 116. Exemplary process 200 (FIG. 2) can also be implemented in hardware, such as in an Application-Specific Integrated Circuit (ASIC), or a combination of software and hardware.

Figure 3:
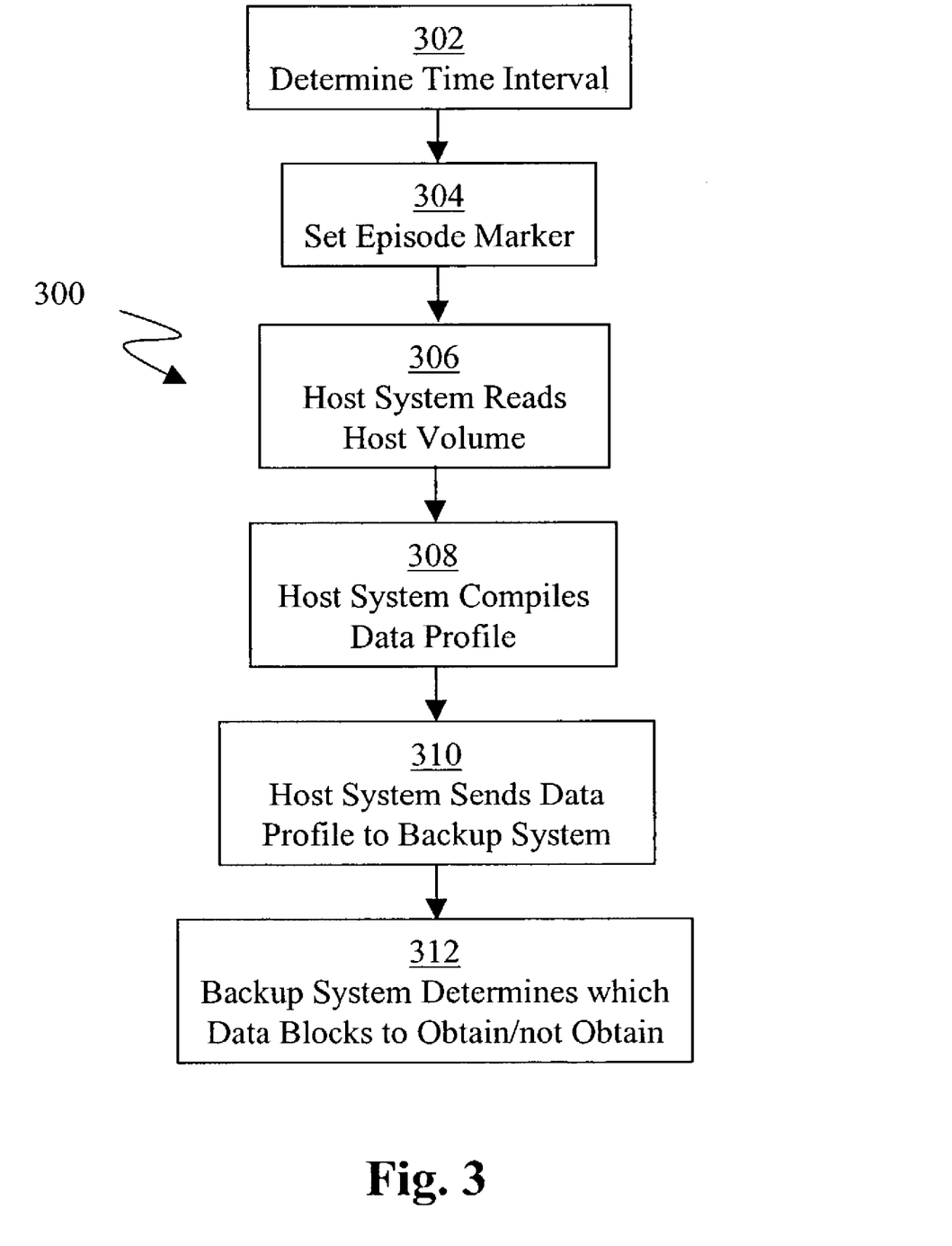
FIG. 3 depicts an exemplary process of backing-up a host volume.

With reference to FIG. 3, an exemplary process 300 is depicted for backing-up a host volume. In step 302, a time interval is determined for the period of time missing from the backup system's most recent copy of the host volume. More particularly, when the first back-up is performed, the time interval is considered to be from the epoch (i.e., the beginning of time) to a set amount of time before the first write successfully transmitted to the backup system from the host system. If the backup system was off line or has gone drown for any period of time, the time interval missing is a set amount of time after the last successful write transmitted to the backup system to a set amount of time before the next write successfully transmitted to the backup system from the host system. It should be recognized that various amounts of time, such as a few nanoseconds, can be used as the set amount of time before the first write or before the next write.

In step 304, an "episode marker" is set to be the end of the determined time interval (i.e., a set amount of time, such as a few nanoseconds, before the first successful write to the backup system from the host system). Thus, the episode marker is a variable/time marker that corresponds to the time when the backup system is in place. As will be described below, the episode marker is then applied to all data copied from the host system to the backup system during the backup process.

In step 306, the host system reads the host volume to examine the data stored on the host volume. In step 308, the host system compiles a data profile for the host volume, which characterizes the examined data. In step 310, the host system sends the data profile to the backup system. In step 312, the backup system determines which data blocks need to be obtained and which do not need to be obtained from the host system.

Figure 4:
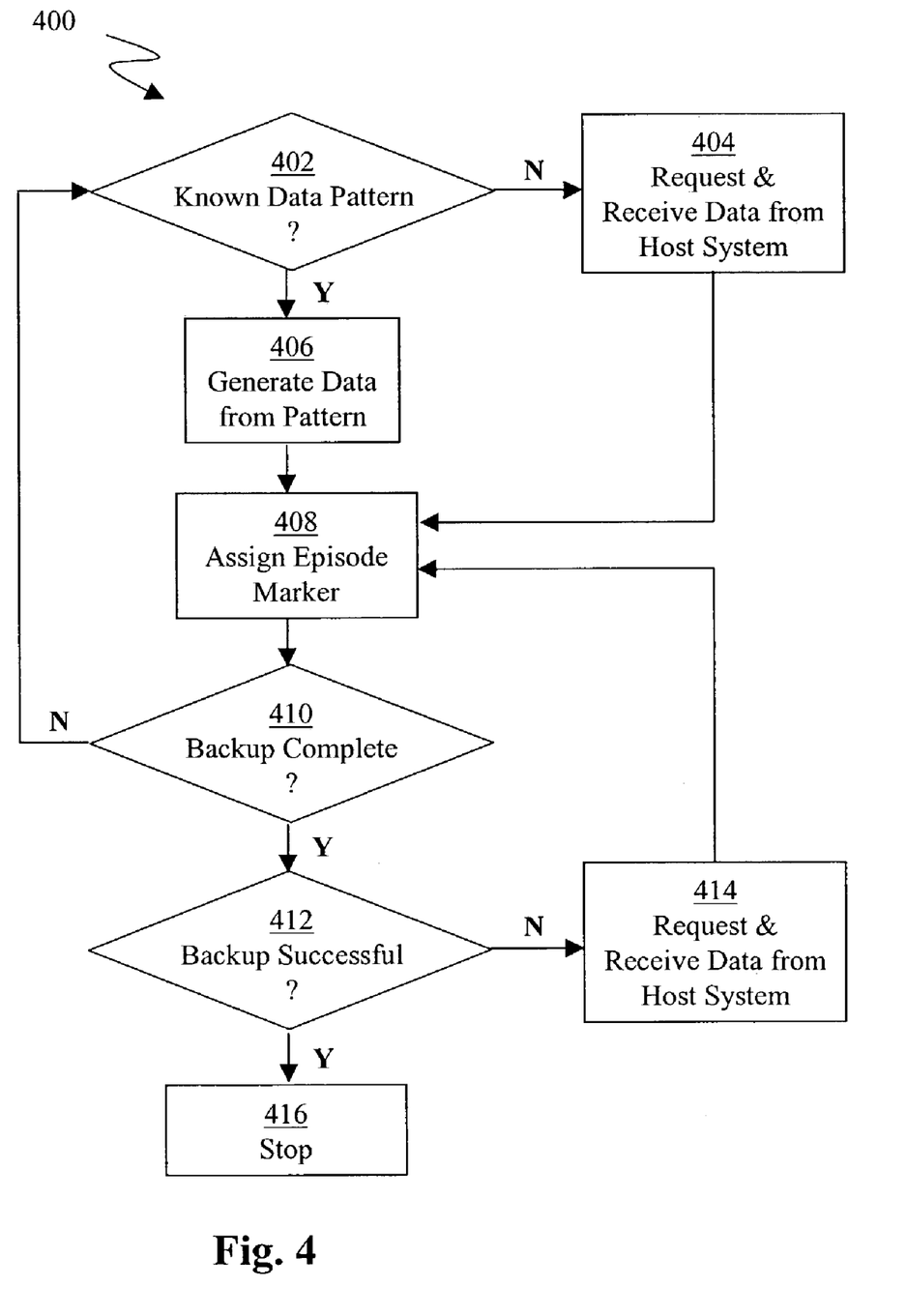
FIG. 4 is an exemplary process of determining data to be obtained from the host volume in the exemplary process of FIG. 3.

More specifically, with reference to FIG. 4, in step 402 of exemplary process 400 the backup system determines whether data contained in a data block corresponds to a known data pattern that can be re-created by the backup system rather than obtaining the data from the host system. As described above, the data profile can include a block state, which indicates if the data in the data block corresponds to a known data pattern, such as all zeros or ones.

If in step 402 the data does not correspond to a known data pattern, then in step 404 the data block is requested and received from the host system. In step 408, the received data block is assigned the episode marker.

If in step 402 the data does correspond to a known data pattern, then in step 406 the data for the data block is generated from the known data pattern. In step 408, the data block is assigned the episode marker.

In step 410, a determination is made as to whether the backup is complete. More particularly, if there are entries in the data profile that have not been processed, then the backup process has not been completed and steps 402-408 are repeated for one of the unprocessed entries in the data profile, which corresponds to another unprocessed data block.

If in step 410 the backup process is determined to have been completed, in step 412 a determination is made as to whether the backup was successful. More particularly, as described above, in one exemplary embodiment, the data profile can include check values, which can be used to determine if the data blocks in the backup volume are the same as those in the host volume. For the data blocks that are found to be different, in step 414 the data blocks are requested and received from the host system. In step 408, the received data blocks are assigned the episode marker. If in step 412 the backup process is determined to have been successful, in step 416 the backup process is stopped.

It should be recognized that exemplary processes 300 (FIG. 3) and 400 (FIG. 4) can include any number of additional steps not depicted in FIGS. 3 and 4. It should also be recognized that processes 300 (FIG. 3) and 400 (FIG. 4) can be implemented as a computer program, which includes computer executable instructions to direct the operation of host system 102 (FIG. 1) and/or backup system 112 (FIG. 1). For example, with reference to FIG. 1, processes 300 (FIG. 3) and 400 (FIG. 4) can be routines within backup software 104, 114 to direct the operation of processors 106, 116. Exemplary processes 300 (FIG. 3) and 400 (FIG. 4) can also be implemented in hardware, such as in an Application-Specific Integrated Circuit (ASIC), or a combination of software and hardware.

Although exemplary embodiments have been described, various modifications can be made without departing from the spirit and/or scope of the present invention. Therefore, the present invention should not be construed as being limited to the specific forms shown in the drawings and described above.

I claim:

1. A method of creating/updating a backup volume based on a host volume, the method comprising:
   reading data stored on the host volume on a host system, wherein the data stored on the host volume includes a plurality of data blocks of a predetermined length;
   generating a data profile for the host volume based on the read data,
      wherein the data profile characterizes the data stored on the host volume, and
      wherein generating a data profile includes:
         assigning a block number to a data block; and
         assigning a block state to the data block, wherein the block state indicates whether the data block is allocated, unallocated, used, or unused, wherein the block number and block state of the data block are included in the data profile;
   sending the data profile to a backup system; and
   determining on the backup system data that does not need to be obtained from the host system based on the data profile.

2. The method of claim 1 wherein determining comprises:
if the block state of a data block indicates that the data block is unallocated and unused, determining that the data block does not need to be obtained from the host system.

3. The method of claim 2, wherein the block state indicates whether the data block contains data corresponding to a common data pattern, and wherein determining comprises:
if the block state of a data block indicates that the data contained in the data block corresponds to a common data pattern, determining that the data block does not need to be obtained from the host system.

4. The method of claim 1, wherein the data stored on the host volume includes a plurality of data blocks of a predetermined length, and wherein generating a data profile includes:
assigning a block number to a data block; and
assigning a check value to the data block, wherein the check value is generated based on the data contained in the data block.

5. The method of claim 4, wherein determining comprises:
generating a check value for a data block in the backup volume corresponding to a block number in the data profile;
comparing the generated check value with the check value corresponding to the block number in the data profile; and
if the check values are the same, determining that the data block does not need to be obtained from the host system.

6. The method of claim 4, further comprising:
assigning a check method code to the data block, wherein the check method code corresponds to a type of check method used to generate the check value.

7. The method of claim 1 further comprising:
setting a time marker corresponding to a time when the backup volume was first created.

8. The method of claim 7 further comprising:
determining a time interval when the backup volume was unavailable.

9. The method of claim 7 further comprising:
determining on the backup system data that needs to be obtained from the host system based on the data profile;
obtaining from the host system the data determined to be needed; and
assigning the obtained data the time marker.

10. A method of creating/updating a backup volume based on a host volume, the method comprising:
reading data stored on the host volume on a host system wherein the data stored on the host volume includes a plurality of data blocks of a predetermined length;
generating a data profile for the host volume based on the read data,
wherein the data profile characterizes the data stored on the host volume and
wherein generating a data profile includes:
assigning block number to a data block; and assigning a block state to the data block indicating whether the data block is allocated, unallocated, used, or unused and wherein the block number and block state of the data block are included in the data profile; and
sending the data profile to a backup system,
wherein the data profile is used by the backup system to determine data that needs to be obtained from the host system.

11. The method of claim 10, wherein the block state is used by the backup system to determine if the data block needs to be obtained from the host system.

12. The method of claim 11, wherein assigning a block state comprises:
assigning a first block state if the data block is unallocated and unused;
assigning a second block state if the data block includes all zeros; and
assigning a third block state if the data block includes all ones,
wherein the first, second, and third block states indicate that the data block does not need to be obtained from the host system.

13. The method of claim 10, wherein the data stored on the host volume includes a plurality of data blocks, and wherein generating a data profile comprises:
assigning a black number to a data block; and
assigning a check value to the data block,
wherein the block state is used by the backup system to determine if the data block needs to be obtained from the host system.

14. The method of claim 13, wherein assigning a check value comprises:
generating a check value for the data block based on data contained in the data block on the host volume.

15. The method of claim 13, further comprising:
assigning a check method code to the data blocks wherein the check method code corresponds to a type of check method used to generate the check value.

16. A method of creating/updating a backup volume based on a host volume, the method comprising:
receiving a data profile from a host system,
wherein the data profile was generated by the host system based on data stored on the host volume on the host system,
wherein the data profile characterizes the data stored on the host volume, and
wherein the data profile includes:
a block number for a data block stored on the host volume; and
a block state for the data block indicating whether the data block is allocated, unallocated, used, or unused; and
examining on a backup system the data profile to determine data that needs to be obtained from the host system.

17. The method of claim 16, wherein examining the data profile comprises:
examining the block state for the data block;
determining if the block state corresponds to a first block state, which indicates that the data block in the host volume was unallocated and unused;
determining if the block state corresponds to a second block state, which indicates that the data block in the host volume contained all zeros;
determining if the block state corresponds to a third block state, which indicates that the data block in the host volume contained all ones; and
when the block state is determined to correspond to the first, second, or third state, determining that the data block does not need to be obtained from the host system.

18. The method of claim 16, wherein the data profile comprises:
a block number for a data block stored on the host volume; and
a check value for the data block.

19. The method of claim 18, wherein examining the data profile comprises:
- generating a check value for a data block in the backup volume corresponding to the block number in the data profile;
- comparing the generated check value with the check value corresponding to the block number in the data profile; and
- if the check values are different determining that the data block needs to be obtained from the host system.

20. The method of claim 18, wherein the data profile further comprises:
- a check method code corresponding to a type of check method used to generate the check value.

21. A system of creating/updating a backup volume based on a host volume, the system comprising:
- a host system having the host volume, wherein the host system is configured to:
  - read data stored on the host volume;
  - generate a data profile that characterizes the read data, wherein the data profile includes:
    - a block number for a data block stored on the host volume; and
    - a block state for the data indicating whether the data block is allocated, unallocated, used, or unused; and
- a backup system having the backup volume, wherein the data profile is sent by the host system to the backup system, and wherein the backup system is configured to:
  - examine the data profile to determine data that needs to be obtained from the host system.

22. A computer-readable storage medium containing computer executable code to create/update a backup volume on a backup system by instructing a host system to operate as follows:

reading data stored on a host volume on the host system;
generating a data profile for the host volume based on the read data,
- wherein the data profile characterizes the data stored on the host volume, and
- wherein the data profile includes:
  - a block number for the data stored on the host volume; and
  - a block state for the data block indicating whether the data block is allocated, unallocated, used, or unused; and
sending the data profile to the backup system,
- wherein the data profile is used by the backup system to determine data that needs to be obtained from the host system.

23. A computer-readable storage medium containing computer executable code to create/update a backup volume by instructing a backup system to operate as follows:
receiving a data profile from a host system,
- wherein the data profile was generated by the host system based on data stored on a host volume on the host system,
- wherein the data profile characterizes the data stored on the host volume, and
- wherein the data profile includes:
  - a block number for a data block stored on the host volume; and
  - a block state for the data black indicating whether the data block is allocated, unallocated, used, unused; and
examining on the backup system the data profile to determine data that needs to be obtained from the host system.

* * * * *